United States Patent [19]

Hurter

[11] Patent Number: 4,866,164
[45] Date of Patent: Sep. 12, 1989

[54] 3-METHYL-1-PHENYL-5-PYROZOLONE-4-AZO-1'-(3'-CHLORO-S-TRIAZINYLAMINS)-BENZENE-6'-SULFONIC ACID COMPOUNDS

[75] Inventor: Rudolf Hurter, Basel, Switzerland

[73] Assignee: Ciba-Geigy Corporation, Ardsley, N.Y.

[21] Appl. No.: 843,441

[22] Filed: Mar. 24, 1986

[30] Foreign Application Priority Data

Apr. 3, 1985 [CH] Switzerland ............... 1435/85

[51] Int. Cl.⁴ .............. C09B 62/085; D06P 1/382; D06P 3/10; D06P 3/24
[52] U.S. Cl. .......................................... 534/636; 8/549
[58] Field of Search ................... 634/636; 8/549

[56]       References Cited
       U.S. PATENT DOCUMENTS

| 2,795,576 | 6/1957 | Fasciati | 534/636 |
| 4,145,340 | 3/1979 | Ridyard | 534/636 X |
| 4,348,318 | 9/1982 | Ruhlmann | 534/636 |
| 4,544,738 | 10/1985 | Baumann et al. | 534/636 X |

FOREIGN PATENT DOCUMENTS

| 115724 | 10/1975 | German Democratic Rep. | 534/636 |
| 50-64317 | 5/1975 | Japan | 534/636 |
| 349015 | 11/1960 | Switzerland | 534/636 |
| 840742 | 7/1960 | United Kingdom | 534/636 |

Primary Examiner—Floyd D. Higel
Attorney, Agent, or Firm—Edward McC. Roberts

[57]       ABSTRACT

The monoazo dyes of the formula

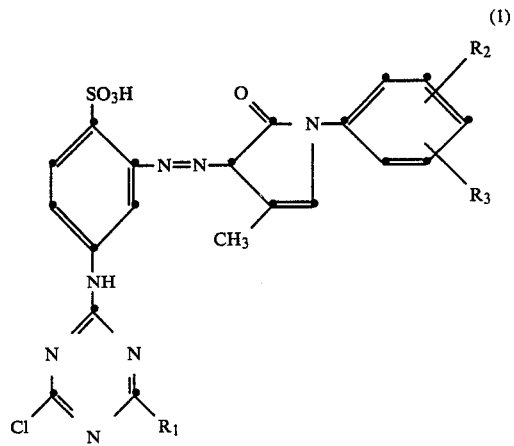

(1)

wherein $R_1$ is N-ethylanilino or anilino which is substituted by $C_2$-$C_5$alkanoylamino, $R_2$ is hydrogen or $C_1$-$C_4$alkyl and $R_3$ is halogen or $C_1$-$C_4$alkyl, produce dyeings and prints of good lightfastness and wetfastness properties on polyamide fibre materials.

19 Claims, No Drawings

3-METHYL-1-PHENYL-5-PYROZOLONE-4-AZO-1′-(3′-CHLORO-S-TRIAZINYLAMINS)-BENZENE-6′-SULFONIC ACID COMPOUNDS

The present invention relates to novel monoazo dyes, to a process for the preparation thereof and to the use of these dyes for dyeing or printing materials of fibrous structure, in particular textile materials.

The present invention has for its object to provide novel monoazo dyes which are suitable for dyeing or printing in particular natural and synthetic polyamide fibre materials from an aqueous bath, which dyes produce shades in the yellow range and which have, in addition to good fastness properties such as lightfastness, wetfastness and stability to formaldehyde, in particular very good water solubility and a high stability in solution in padding liquors at various pH values as well as good printing paste stability.

This object is accomplished with the monoazo dyes of formula (1) of the present invention.

Accordingly, the present invention relates to monoazo dyes of the formula

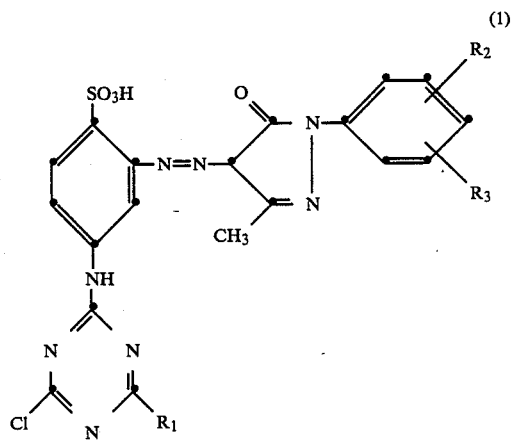
(1)

wherein $R_1$ is N-ethylanilino or anilino which is substituted by $C_2$-$C_5$alkanoylamino, $R_2$ is hydrogen or $C_1$-$C_4$alkyl and $R_3$ is halogen or $C_1$-$C_4$alkyl.

$R_1$ as anilino which is substituted by $C_2$-$C_5$alkanoylamino is an aniline radical which is substituted in the 2-, 3- or, preferably, 4-position e.g. by acetylamino, propionylamino, butyrylamino, isobutyrylamino, valerylamino, isovalerylamino or pivaloylamino; with the propionylamino radical being preferred.

$R_2$ and $R_3$ as $C_1$-$C_4$alkyl may each independently of the other be methyl, ethyl, propyl, isopropyl, n-butyl, sec-butyl, isobutyl or tert-butyl.

$R_3$ as halogen is preferably fluorine, chlorine or bromine.

Preferred monoazo dyes of formula (1) are those wherein $R_1$ is
(a) N-ethylanilino or
(b) anilino which is substituted by $C_2$-$C_4$alkanoylamino.

Particularly preferred monoazo dyes of formula (1) are those wherein
(c) $R_2$ is hydrogen and $R_3$ is chlorine, methyl or ethyl, or
(d) $R_2$ is methyl and $R_3$ is chlorine, methyl or ethyl.

The most preferred monoazo dyes are those of the formula

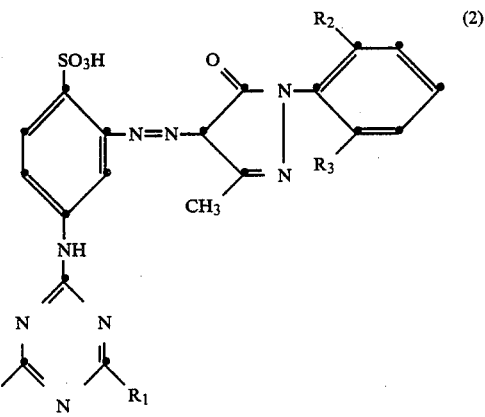
(2)

wherein $R_1$, $R_2$ and $R_3$ are as defined for formula (1).

Among the monoazo dyes of formula (2), particularly preferred dyes are those wherein $R_1$ is N-ethylanilino or 4-propionylaminoanilino, $R_2$ is hydrogen or methyl and $R_3$ is chlorine, methyl or ethyl; and most particularly the monoazo dyes of the formulae

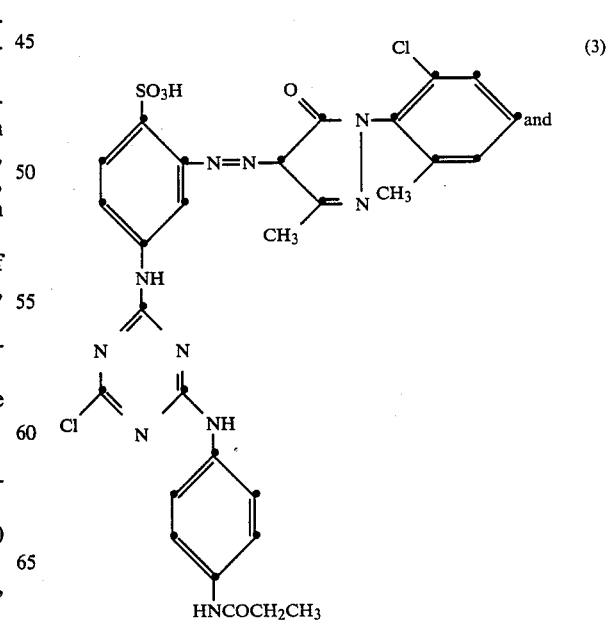
(3)

and

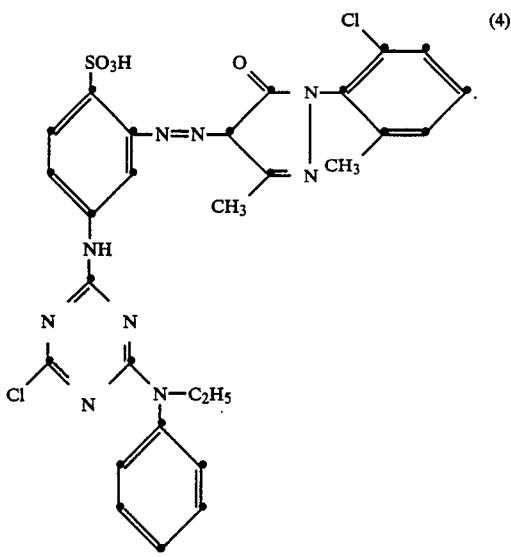

The invention also relates to a process for the preparation of monoazo dyes of formula (1). Said process comprises condensing, diazotising and coupling in any sequence 2,4,6-trichloro-1,3,5-triazine, an amine of the formula $$H—R_1 \qquad (5),$$

1,3-diaminobenzene-4-sulfonic acid and a pyrazolone of the formula

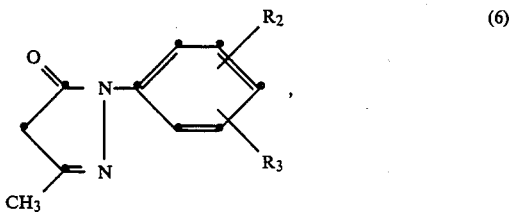

the symbols $R_1$, $R_2$ and $R_3$ being defined for formula (1).

Since the individual process steps indicated above, i.e. condensation, diazotisation and coupling, may be carried out in varying sequence and, where appropriate, in some cases simultaneously, different procedures are possible. The starting materials to be employed for each partial reaction follow from formula (1). In general the reaction is carried out stepwise in succession. The sequence of the simple reactions between the individual reaction components of formulae (5) and (6), 2,4,6-trichloro-1,3,5-triazine and 1,3-diaminobenzene-4-sulfonic acid may be selected freely.

Preferred procedures comprise (a) condensing 2,4,6-trichloro-1,3,5-triazine in equimolar amount with an amine of formula (5) and 1,3-diaminobenzene-4-sulfonic acid, diazotising the resulting condensation product and coupling the diazotisation product with a pyrazolone of formula (6);

(b) condensing a dichloro-s-triazine of the formula

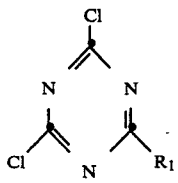

wherein $R_1$ is as defined for formula (1), with 1,3-diaminobenzene-4-sulfonic acid, diazotising the resultant condensation product and coupling the diazotisation product with a pyrazolone of formula (6); or (c) diazotising 1,3-diaminobenzene-4-sulfonic acid and coupling the diazotisation product with a pyrazolone of formula (6) and condensing the resultant monoazo compound with a dichloro-s-triazine of formula (7).

The diazotisation of 1,3-diaminobenzene-4-sulfonic acid is usually effected by treatment with nitrous acid in an aqueous solution of mineral acid at low temperature. Coupling to the pyrazolone of formula (6) is carried out in the weakly acid, neutral or weakly alkaline pH range.

The condensation of 2,4,6-trichloro-1,3,5-triazine with an amine of formula (5) and 1,3-diaminobenzene-4-sulfonic acid or the condensation of the dichloro-s-triazine of formula (7) with 1,3-diaminobenzene-4-sulfonic acid is preferably carried out in aqueous solution or suspension, at low temperature and in the weakly acid, neutral or weakly alkaline pH range. Hydrogen chloride evolved during the condensation is conveniently neutralised by the continuous addition of aqueous alkali metal hydroxides, carbonates or bicarbonates.

For the coupling reactions in which 1,3-diaminobenzene-4-sulfonic acid is employed as diazo component it is in some cases convenient not to employ this acid itself but, in its place, a 1-acylamino-3-aminobenzene-4-sulfonic acid, e.g. 1-acetylamino-3-aminobenzene-4-sulfonic acid, from which, when coupling is complete, the acetyl group is removed by saponification before condensing further. It is also possible to employ as diazo component the nitroamino compound, 1-nitro-3-aminobenzene-4-sulfonic acid, in which case, after coupling, the nitro group is reduced with sodium sulfide or sodium hydrosulfide to the amino group.

Dichloro-s-triazines of formula (7) are known. They are prepared by condensing 2,4,6-trichloro-s-triazine (cyanuric chloride) in the molar ratio of 1:1 with n-ethylaniline or with an aniline which is substituted by $C_2$-$C_5$alkanoylamino.

In the process of the present invention it is preferred to employ amines of formula (5) or dichloro-s-triazines of formula (7) wherein $R_1$ is (a) N-ethylanilino or (b) anilino which is substituted by $C_2$-$C_4$alkanoylamino.

In the process of the present invention it is particularly preferred to employ pyrazolones of formula (6) wherein (c) $R_2$ is hydrogen and $R_3$ is chlorine, methyl or ethyl, or (d) $R_2$ is methyl and $R_3$ is chlorine, methyl or ethyl.

The preferred monoazo dyes of formula (2) are prepared by employing in the process of this invention pyrazolones of the formula

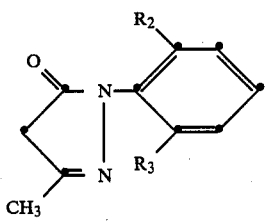

(8)

wherein $R_2$ and $R_3$ are as defined for formula (1).

It is most preferred to employ amines of formula (5) of dichloro-s-triazines of formula (7) wherein $R_1$ is N-ethylanilino or 4-propionylaminoanilino, and pyrazolones of formula (8) wherein $R_2$ is hydrogen or methyl and $R_3$ is chlorine, methyl or ethyl.

The particularly interesting monoazo dyes of formulae (3) and (4) are prepared by diazotising the secondary condensation product of 2,4,6-trichloro-1,3,5-triazine, the equimolar amount of 1,3-diaminobenzene-4-sulfonic acid and the equimolar amount of N-ethylaniline or 4-propionylaminoaniline and coupling the diazotisation product with 1-(2'-chloro-6'-methylphenyl)-3-methyl-5-pyrazolone.

Examples of starting materials for the preparation of the monoazo dyes of formula (1) are:

Amines of formula (5)

N-ethylaniline, 2-, 3- or 4-acetylaminoaniline, 2-, 3- or 4-propionylaminoaniline, 2-, 3- or 4-butyrylaminoaniline, 2-, 3- or 4-isobutyrylaminoaniline, 2-, 3- or 4-valerylaminoaniline, 2-, 3- or 4-isovalerylaminoaniline, 2-, 3- or 4-pivaloylaminoaniline.

2,4,6-Trichloro-1,3,5-triazine

Dichloro-s-triazines of formula (7)

2,4-dichloro-6-N-ethylphenylamino-, -6-(2'-, 3'- or 4'-acetylaminoanilino)-, -6-(2'-, 3'- or 4'-propionylaminoanilino)-, -6-(2'-, 3'- or 4'-butyrylaminoanilino)-, -6-(2'-, 3'- or 4'-isobutyrylaminoanilino)-, -6-(2'-, 3'- or 4'-valerylaminoanilino)-, -6-(2'-, 3'- or 4'-isovalerylaminoanilino)-, -6-(2'-, 3'- or 4'-pivaloylaminoanilino)-1,3,5-triazine.

Diazo components 1,3-diaminobenzene-4-sulfonic acid, 1-acetylamino-3-aminobenzene-4-sulfonic acid, 1-nitro-3-aminobenzene-4-sulfonic acid.

Pyrazolones of formula (6)

1-(2'-, 3'- or 4'-chlorophenyl)-3-methyl-5-pyrazolone,
1-(2'-, 3'- or 4'-methylphenyl)-3-methyl-5-pyrazolone,
1-(2'-, 3'- or 4'-ethylphenyl)-3-methyl-5-pyrazolone,
1-(2'-, 3'- or 4'-propylphenyl)-3-methyl-5-pyrazolone,
1-(2'-, 3'- or 4'-isopropylphenyl)-3-methyl-5-pyrazolone,
1-(2'-, 3'- or 4'-butylphenyl)-3-methyl-5-pyrazolone,
1-(2'-chloro-6'-methylphenyl)-3-methyl-5-pyrazolone,
1-(2'-chloro-6'-ethylphenyl)-3-methyl-5-pyrazolone,
1-(2'-, 6'-dimethylphenyl)-3-methyl-5-pyrazolone,
1-(2'-methyl-6'-ethylphenyl)-3-methyl-5-pyrazolone.

The monoazo dyes of formula (1) are obtained either in the form of their free sulfonic acid or, preferably, in the form of their salts. Examples of suitable salts are the alkali metal, alkaline earth metal or ammonium salts or the salts of an organic amine. Examples of such salts are the sodium, lithium, potassium or ammonium salts or the salt of triethanolamine.

The azo dyes of formula (1) can be isolated and processed to useful dry dyeing preparations. Isolation is preferably effected at the lowest possible temperatures by salting out and filtration or by reverse osmosis or ultrafiltration. The filtered dyes may, if desired, be dried after the addition of extenders and/or buffers, e.g. after the addition of a mixture of equal parts of mono- and disodium phosphate; drying is preferably effected at temperatures which are not too high and under reduced pressure. In certain cases, by spray drying the entire mixture obtained by the process of this invention, the dry preparations of this invention can be prepared direct, i.e. without intermediate isolation of the dyes.

The azo dyes of formula (1) are novel. They produce dyeings with good wetfastness and lightfastness properties. The dyeings are dischargeable. Apart from their surprisingly good water solubility, the azo dyes of formula (1) are distinguished by a high stability in solution in padding liquors at different pH values and by very good printing paste stability.

The azo dyes of formula (1) are suitble for dyeing and printing a very wide range of materials such as materials containing nitrogen groups or hydroxyl groups, e.g. cotton and, in particular, silk, wool or superpolyamide fibres. The azo dyes of formula (1) are suitable both for the exhaust process and for dyeing by the pad dyeing process, in which the goods are impregnated with aqueous dye solutions which may also contain salts.

The azo dyes of formula (1) are also suitable for printing nitrogen-containing fibers, e.g. wool, superpolyamides or blends containing silk or wool.

It is recommended to subject the dyeings and prints to a thorough rinsing with cold and hot water, if necessary with the addition of a compound which acts as dispersant and promotes the diffusion of non-fixed dye.

The invention is illustrated by the following Examples in which parts are by weight. The ratio of parts by weight to parts by volume is that same as that of grams to cubic centimetres.

EXAMPLE 1

71.5 g of the secondary condensation product of 1 mole of cyanuric chloride, 1 mole of N-ethylaniline and 1 mole of 1,3-diaminobenzene-4-sulfonic acid are dissolved warm in 425 ml of water, with the simultaneous addition of 16.5 ml of a 30 % solution of sodium hydroxide. After the addition of 42.5 ml of a 4 n solution of sodium nitrate, the resultant solution is diluted with 425 g of ice. 153 ml of an approximately 3.8 normal solution of naphthalene-1-sulfonic acid are then added. The resultant diazo suspension is allowed to stand for 2 to 3 hours until diazotisation is complete. Any excess of nitrite still present is destroyed with sulfamic acid.

37.8 g of 1-(2'-methyl-6'-chlorophenyl)-3-methyl-5-pyrazolone are dissolved hot in 425 ml of water, with the simultaneous addition of 17 ml of a 30 % solution of sodium hydroxide. After the solution has cooled to 2° C., the diazo suspension prepared by the procedure described above is added, and the pH value is held at 8.5 with sodium hydroxide solution. When the coupling is complete, the reaction mixture is filtered. The filter cake is suspended in 300 ml of a solution of sodium chloride, with the simultaneous addition of 50 ml of ethanol. The filter cake is then isolated by filtration, washed and dried in vacuo at 50°–60° C.

Yield: 121 g of the dye of the formula

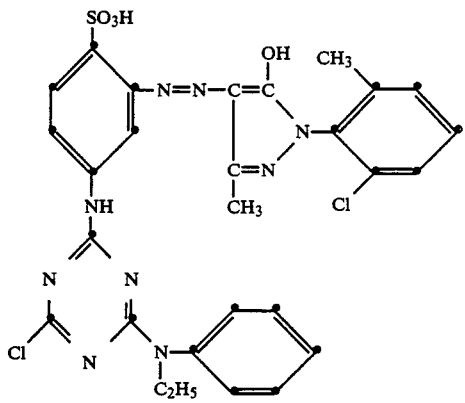

The dye is in the form of a yellow powder which dyes wool and polyamide fibres from a neutral or weakly acetate bath in a level greenish yellow shade.

By following the procedure described in Example 1, but using the diazo components and coupling components listed in the following Table, there are also obtained water-soluble dyes which dye polyamide in the indicated shade with good fastness properties.

| Example | Diazo component | Coupling component | Shade |
|---|---|---|---|
| 2 | | | greenish yellow |
| 3 | | | greenish yellow |
| 4 | | | greenish yellow |

-continued
| Example | Diazo component | Coupling component | Shade |
|---|---|---|---|
| 5 | 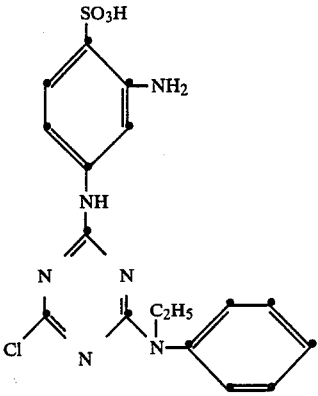 | 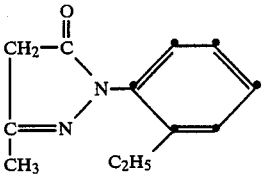 | greenish yellow |
| 6 | 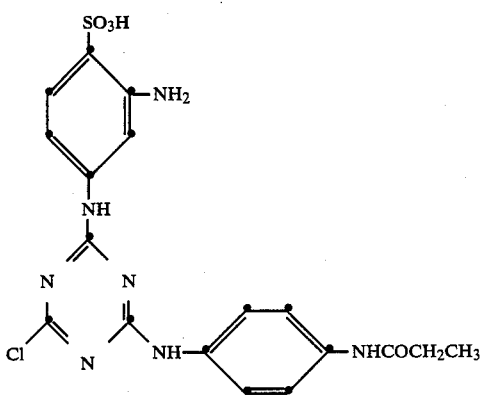 | 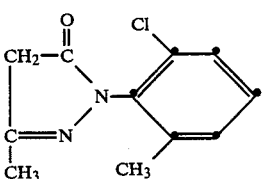 | greenish yellow |
| 7 | 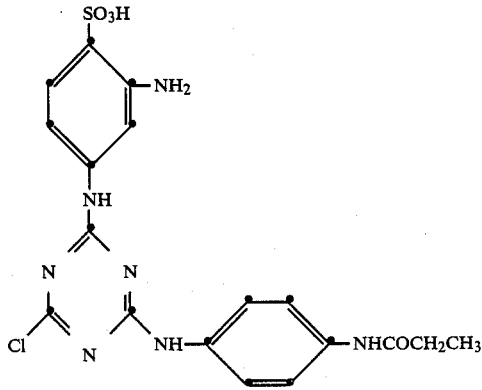 | 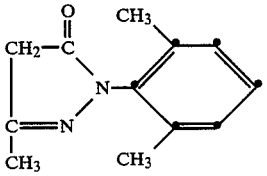 | greenish yellow |
| 8 | 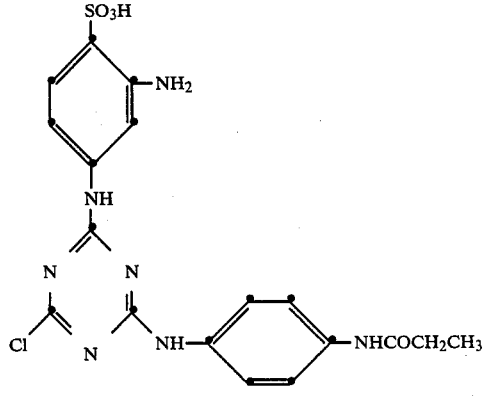 | 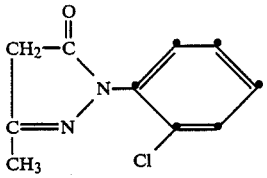 | greenish yellow |

| Example | Diazo component | Coupling component | Shade |
|---|---|---|---|
| 9 | 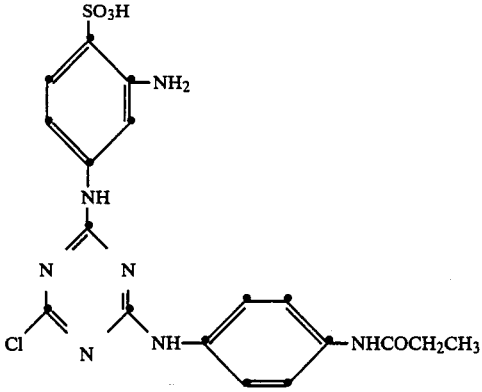 | 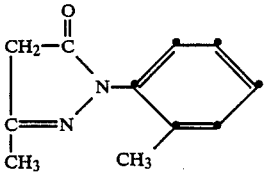 | greenish yellow |
| 10 | 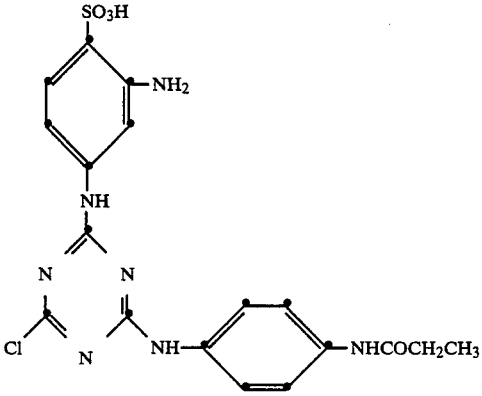 | 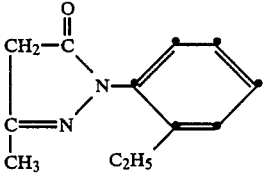 | greenish yellow |

Compared with the known dye disclosed in US patent specification 2 795 576 in Example 1 of the Table, which dye is of the formula

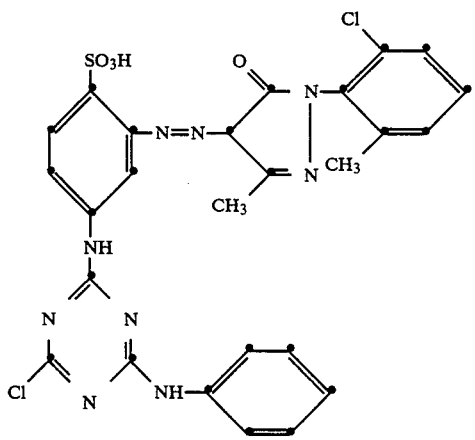

the monoazo dyes of the above Example 1 to 10 of this invention have a better water solubility, better stability in solution in padding liquors at pH values of 3.5, 4 and 7 as well as a better printing paste stability with the addition of various thickeners.

Dyeing Procedure I 10 parts of a polyamide 6.6 tricot are dyed in 500 parts of an aqueous bath which contains 1 g/l of monosodium phosphate and is adjusted with disodium phosphate to pH 6. The concentration of dye of Example 1 is 0.8%, based on the weight of the fabric. The dyeing time at 98° C. is 30 to 90 minutes. The dyed helanca fabric is then removed from the bath and washed and dried in the conventional manner. The helanca fabric is dyed in a pure greenish yellow shade of good general fastness properties.

Dyeing Procedure II 100 parts of woollen knitting yarn are put at 50° C. into a dye bath which contains 0.9 parts of the dye of Example 6 of the Table and 5 parts of sodium sulfate in 4000 litres of water and which has been adjusted to pH 5.5 with 80 % acetic acid. The bath is brought to the boil over 45 minutes and kept at boiling temperature for a further 45 minutes. The goods are then removed from the bath, thoroughly rinsed with cold water and dried. A greenish yellow dyeing of good fastness properties is obtained on the wool.

Printing Procedure I (fabric printing)

In a conventional textile printing machine, a woven polyamide 6 or 6.6 tricot is printed with a paste which contains (a) 20 g of the dye of Example 6 of the Table,
(b) 50 g of urea,
(c) 20 g of thiodiethylene glycol,
(d) 320 g of water
(e) 500 g of 10% plant seed gum derivative or guar gum derivative and
(f) 60 g of 15° Bé ammonium tartrate solution based on 1000 g of printing paste.

The printed fabric is dried in a drying oven at 70° to 80° C. and then treated with saturated steam at 101° to 103° C. for 20 to 30 minutes in order to fix the dye. The fabric is subsequently rinsed cold for 10 minutes, washed for 15 minutes at 50° to 60° C. with 2 g/l of a synthetic detergent, rinsed cold again and then dried. A levelly and completely fixed print in greenish yellow shade with sharp contours and good fastness properties is obtained. In order to assess the fine dispersion, the printing paste is applied in dilute form. The printed material is in this case speck-free.

Printing Procedure II (carpet printing)

In a conventional flat bed or rotary carpet printing machine, a polyamide 6 or 6.6 tufted carpet is printed with a paste which contains per kg of goods
(a) 5 g of the dye of Example 1,
(b) 350 g of water,
(c) 400 g of 3.5% plant seed gum derivative or guar gum derivative,
(d) 2 g of an antifrosting preparation based on alkylaryl polyglycol ether sulfate,
(e) 0.5 g of a silicone-free defoaming agent based on high-boiling alcohols and which is adjusted to pH 3.5 with citric acid.

The printed carpet is treated in the saturated steam range for 2 to 3 minutes, then rinsed and dried. A levelly and completely fixed print in greenish yellow shade with sharp contours and good fastness properties is obtained.

What is claimed is:

1. A monoazo dye of the formula

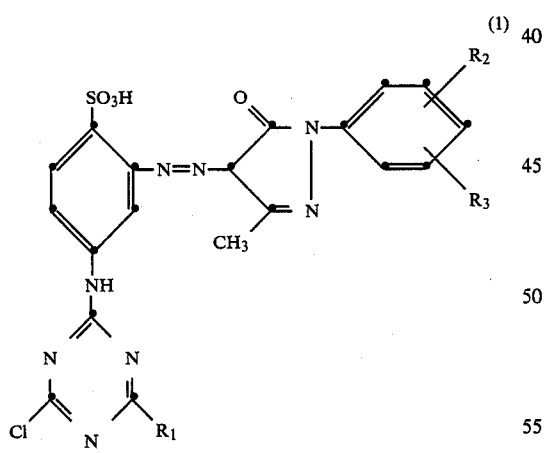

(1)

wherein $R_1$ is N-ethylanilino or anilino which is substituted by $C_2$-$C_5$alkanoylamino, $R_2$ is hydrogen or $C_1$-$C_4$ alkyl and $R_3$ is halogen or $C_1$-$C_4$alkyl.

2. A dye according to claim 1 wherein $R_1$ is N-ethylanilino.

3. A dye according to claim 2, wherein $R_2$ is hydrogen and $R_3$ is chlorine, methyl or ethyl.

4. A dye according to claim 2, wherein $R_2$ is methyl and $R_3$ is chlorine, methyl or ethyl.

5. A dye according to claim 2 of the formula

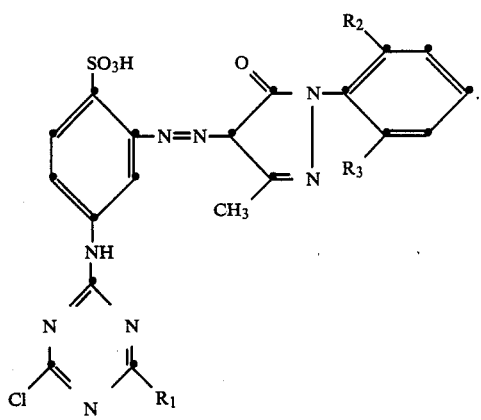

6. A dye according to claim 5, wherein $R_2$ is hydrogen or methyl and $R_3$ is chlorine, methyl or ethyl.

7. A dye according to claim 6 of the formula

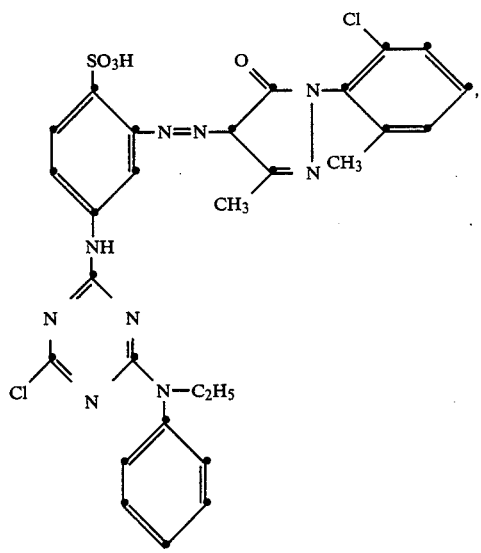

8. A dye according to claim 6 of the formula

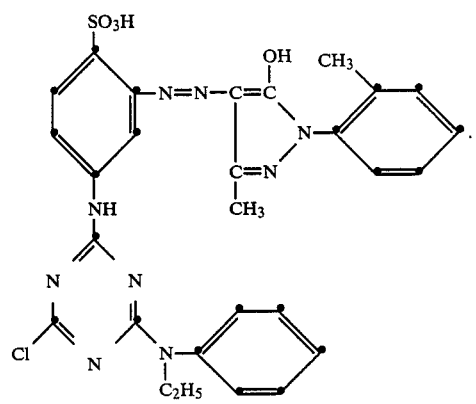

9. A dye according to claim 6 of the formula

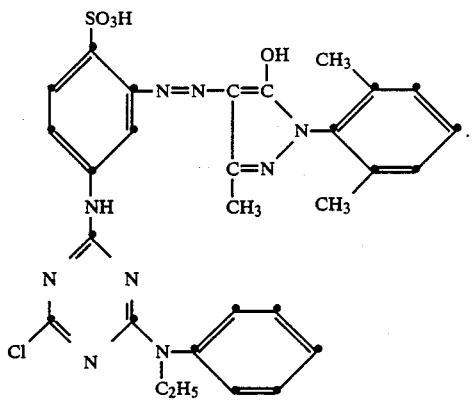

10. A process of dyeing or printing a wool or synthetic polyamide fiber material which comprises contacting said fiber material with a dye of claim 2.

11. A process according to claim 10 wherein said fiber material is synthetic polyamide.

12. A dye according to claim 1 wherein $R_1$ is anilino substituted by $C_2$-$C_5$-alkanoylamino.

13. A dye according to claim 12, wherein $R_2$ is hydrogen and $R_3$ is chlorine, methyl or ethyl.

14. A dye according to claim 12, wherein $R_2$ is methyl and $R_3$ is chlorine, methyl or ethyl.

15. A dye according to claim 12 of the formula

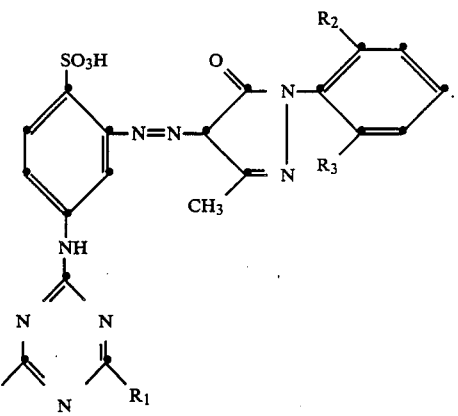

16. A dye according to claim 15, wherein $R_1$ is 4-propionylaminoanilino, $R_2$ is hydrogen or methyl and $R_3$ is chlorine, methyl or ethyl.

17. A dye according to claim 16 of the formula

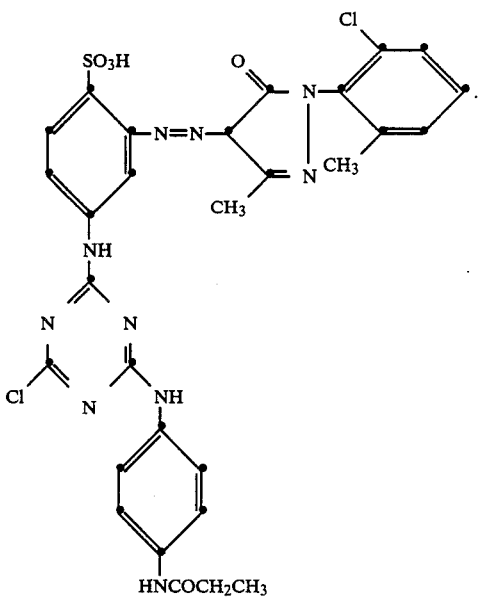

18. A process for dyeing or printing a wool of synthetic polyamide fiber material which comprises contacting said fiber material with a dye of claim 12.

19. A process according to claim 18, wherein said fiber material is synthetic polyamide.

* * * * *